(12) United States Patent
Shah et al.

(10) Patent No.: US 11,656,981 B2
(45) Date of Patent: May 23, 2023

(54) MEMORY REDUCTION IN A SYSTEM BY OVERSUBSCRIBING PHYSICAL MEMORY SHARED BY COMPUTE ENTITIES SUPPORTED BY THE SYSTEM

(71) Applicant: Microsoft Technology Licensing, LLC, Redmond, WA (US)

(72) Inventors: Monish Shantilal Shah, Sammamish, WA (US); Lisa Ru-Feng Hsu, Durham, NC (US); Daniel Sebastian Berger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/881,257

(22) Filed: Aug. 4, 2022

(65) Prior Publication Data
US 2023/0004488 A1  Jan. 5, 2023

Related U.S. Application Data

(63) Continuation of application No. 17/367,061, filed on Jul. 2, 2021, now Pat. No. 11,455,239.

(51) Int. Cl.
G06F 12/00 (2006.01)
G06F 12/02 (2006.01)
G06F 12/1027 (2016.01)

(52) U.S. Cl.
CPC ........ G06F 12/023 (2013.01); G06F 12/1027 (2013.01); G06F 2212/1044 (2013.01)

(58) Field of Classification Search
CPC .... G06F 12/023; G06F 12/1027; G06F 12/10; G06F 2212/1044; G06F 9/45533
See application file for complete search history.

(56) References Cited

U.S. PATENT DOCUMENTS

| 8,583,875 B1* | 11/2013 | Garthwaite ............. G06F 12/08 711/6 |
| 2011/0320682 A1 | 12/2011 | Mcdougall et al. |
| 2020/0159558 A1* | 5/2020 | Bak ..................... G06F 9/45558 |
| 2020/0241902 A1 | 7/2020 | Freche et al. |
| 2020/0371692 A1 | 11/2020 | Van Doorn et al. |
| 2021/0132999 A1 | 5/2021 | Haywood et al. |

OTHER PUBLICATIONS

"International Search Report and Written Opinion Issued in PCT Application No. PCT/US22/030990", dated Sep. 28, 2022, 12 Pages.

* cited by examiner

*Primary Examiner* — Shawn X Gu
(74) *Attorney, Agent, or Firm* — Ranjeev Singh; Singh Law, PLLC

(57) ABSTRACT

Methods and systems related to memory reduction in a system by oversubscribing physical memory shared among compute entities are provided. A portion of the memory includes a combination of a portion of a first physical memory of a first type and a logical pooled memory associated with the system. A logical pooled memory controller is configured to: (1) track both a status of whether a page of the logical pooled memory allocated to any of the plurality of compute entities is a known-pattern page and a relationship between logical memory addresses and physical memory addresses associated with any allocated logical pooled memory, and (2) allow the write operation to write data to any available space in the second physical memory of the first type only up to an extent of physical memory that corresponds to the portion of the logical pooled memory previously allocated to the compute entity.

20 Claims, 9 Drawing Sheets

```
┌─────────────────────────────────────────────────────────────────────┐
│ ALLOCATING A PORTION OF A MEMORY ASSOCIATED WITH A SYSTEM TO A COMPUTE ENTITY, WHERE │
│ THE PORTION OF THE MEMORY COMPRISES A COMBINATION OF A PORTION OF A FIRST PHYSICAL   │
│ MEMORY OF A FIRST TYPE AND A PORTION OF A LOGICAL POOLED MEMORY ASSOCIATED WITH THE  │
│ SYSTEM, WHERE THE LOGICAL POOLED MEMORY IS MAPPED TO A SECOND PHYSICAL MEMORY OF THE │
│ FIRST TYPE, AND WHERE AN AMOUNT OF THE LOGICAL POOLED MEMORY INDICATED AS BEING      │
│ AVAILABLE FOR ALLOCATION TO THE PLURALITY OF COMPUTE ENTITIES IS GREATER THAN AN AMOUNT │
│ OF THE SECOND PHYSICAL MEMORY OF THE FIRST TYPE                                      │
└─────────────────────────────────────────────────────────────────────┘
                                    │
                                    ▼  810
┌─────────────────────────────────────────────────────────────────────┐
│ INDICATING TO A LOGICAL POOLED MEMORY CONTROLLER ASSOCIATED WITH THE LOGICAL POOLED  │
│ MEMORY THAT ALL PAGES ASSOCIATED WITH THE LOGICAL POOLED MEMORY INITIALLY ALLOCATED  │
│ TO ANY OF THE PLURALITY OF COMPUTE ENTITIES ARE KNOWN-PATTERNS PAGES                 │
└─────────────────────────────────────────────────────────────────────┘
                                    │
                                    ▼  820
┌─────────────────────────────────────────────────────────────────────┐
│ THE LOGICAL POOLED MEMORY CONTROLLER TRACKING BOTH A STATUS OF WHETHER A PAGE OF     │
│ THE LOGICAL POOLED MEMORY ALLOCATED TO ANY OF THE PLURALITY OF COMPUTE ENTITIES IS A │
│ KNOWN-PATTERN PAGE AND A RELATIONSHIP BETWEEN LOGICAL MEMORY ADDRESSES AND PHYSICAL  │
│ MEMORY ADDRESSES ASSOCIATED WITH ANY ALLOCATED LOGICAL POOLED MEMORY TO ANY OF THE   │
│ PLURALITY OF COMPUTE ENTITIES                                                        │
└─────────────────────────────────────────────────────────────────────┘
                                    │
                                    ▼  830
┌─────────────────────────────────────────────────────────────────────┐
│ IN RESPONSE TO A WRITE OPERATION INITIATED BY THE COMPUTE ENTITY, THE LOGICAL POOLED │
│ MEMORY CONTROLLER ALLOWING WRITING OF THE DATA TO ANY AVAILABLE SPACE IN THE SECOND  │
│ PHYSICAL MEMORY OF THE FIRST TYPE ONLY UP TO AN EXTENT OF PHYSICAL MEMORY THAT       │
│ CORRESPONDS TO THE PORTION OF THE LOGICAL POOLED MEMORY PREVIOUSLY ALLOCATED TO THE  │
│ COMPUTE ENTITY                                                                       │
└─────────────────────────────────────────────────────────────────────┘
                          800                840

FIG. 8
```

ALLOCATING A PORTION OF A MEMORY ASSOCIATED WITH A SYSTEM TO A COMPUTE ENTITY, WHERE THE PORTION OF THE MEMORY COMPRISES A COMBINATION OF A PORTION OF A FIRST PHYSICAL MEMORY OF A FIRST TYPE AND A PORTION OF A LOGICAL POOLED MEMORY ASSOCIATED WITH THE SYSTEM, WHERE THE LOGICAL POOLED MEMORY IS MAPPED TO A SECOND PHYSICAL POOLED MEMORY OF THE FIRST TYPE, AND WHERE AN AMOUNT OF THE LOGICAL POOLED MEMORY INDICATED AS BEING AVAILABLE FOR ALLOCATION TO THE PLURALITY OF COMPUTE ENTITIES IS GREATER THAN AN AMOUNT OF THE SECOND PHYSICAL POOLED MEMORY OF THE FIRST TYPE

910

TRANSLATING ANY LOAD OR STORE INSTRUCTIONS DIRECTED TO THE LOGICAL POOLED MEMORY INTO MEMORY TRANSACTIONS FOR COMPLETION VIA A RESPECTIVE LINK BETWEEN EACH OF THE PLURALITY OF COMPUTE ENTITIES AND EACH OF PHYSICAL MEMORY DEVICES INCLUDED AS PART OF THE SECOND PHYSICAL POOLED MEMORY OF THE FIRST TYPE

920

INDICATING TO A LOGICAL POOLED MEMORY CONTROLLER ASSOCIATED WITH THE LOGICAL POOLED MEMORY THAT ALL PAGES ASSOCIATED WITH THE LOGICAL POOLED MEMORY INITIALLY ALLOCATED TO ANY OF THE PLURALITY OF COMPUTE ENTITIES ARE KNOWN-PATTERN PAGES

930

THE LOGICAL POOLED MEMORY CONTROLLER TRACKING BOTH A STATUS OF WHETHER A PAGE OF THE LOGICAL POOLED MEMORY ALLOCATED TO ANY OF THE PLURALITY OF COMPUTE ENTITIES IS A KNOWN-PATTERN PAGE AND A RELATIONSHIP BETWEEN LOGICAL MEMORY ADDRESSES AND PHYSICAL MEMORY ADDRESSES ASSOCIATED WITH ANY ALLOCATED LOGICAL POOLED MEMORY TO ANY OF THE PLURALITY OF COMPUTE ENTITIES

940

IN RESPONSE TO A WRITE OPERATION INITIATED BY THE COMPUTE ENTITY TO WRITE ANY DATA OTHER THAN A KNOWN-PATTERN, THE LOGICAL POOLED MEMORY CONTROLLER ALLOWING WRITING OF THE DATA TO ANY AVAILABLE SPACE IN THE SECOND PHYSICAL POOLED MEMORY OF THE FIRST TYPE ONLY UP TO AN EXTENT OF PHYSICAL MEMORY THAT CORRESPONDS TO THE PORTION OF THE LOGICAL POOLED MEMORY PREVIOUSLY ALLOCATED TO THE COMPUTE ENTITY

950

MEMORY REDUCTION IN A SYSTEM BY OVERSUBSCRIBING PHYSICAL MEMORY SHARED BY COMPUTE ENTITIES SUPPORTED BY THE SYSTEM

CROSS-REFERENCE TO RELATED APPLICATION(S)

This application is a continuation of U.S. patent application Ser. No. 17/367,061, filed on Jul. 2, 2021, now U.S. Pat. No. 11,455,239, entitled "MEMORY REDUCTION IN A SYSTEM BY OVERSUBSCRIBING PHYSICAL MEMORY SHARED BY COMPUTE ENTITIES SUPPORTED BY THE SYSTEM," the entire contents of which are hereby incorporated herein by reference.

BACKGROUND

Multiple users or tenants may share systems, including computing systems and communications systems. Computing systems may include the public cloud, the private cloud, or a hybrid cloud having both public and private portions. The public cloud includes a global network of servers that perform a variety of functions, including storing and managing data, running applications, and delivering content or services, such as streaming videos, provisioning electronic mail, providing office productivity software, or handling social media. The servers and other components may be located in data centers across the world. While the public cloud offers services to the public over the Internet, businesses may use private clouds or hybrid clouds. Both private and hybrid clouds also include a network of servers housed in data centers.

Multiple tenants may use compute, storage, and networking resources associated with the servers in the cloud. As an example, compute entities associated with different tenants may be allocated a certain amount of the compute and memory resources. In many such situations, the allocated resources to various compute entities, including the memory resources, may be under-utilized. In other systems, such as communications systems, including base stations, similar underutilization of the memory resources may occur.

SUMMARY

In one example, the present disclosure relates to a method comprising allocating a portion of a memory associated with a system to a compute entity, where the portion of the memory comprises a combination of a portion of a first physical memory of a first type and a portion of a logical pooled memory for use with a plurality of compute entities associated with the system. As used herein, the term "compute entity" encompasses, but is not limited to, any executable code (in the form of hardware, firmware, software, or in any combination of the foregoing) that implements a functionality, a virtual machine, an application, a service, a micro-service, a container, a unikernel for serverless computing, or a part of the aforementioned. As used herein the term "logical pooled memory" refers to memory that includes overcommitted physical memory that is shared by a plurality of compute entities, which may correspond to a single host or multiple hosts. The logical pooled memory may be mapped to a second physical memory of the first type, and where an amount of the logical pooled memory indicated as being available for allocation to the plurality of compute entities may be greater than an amount of the second physical memory of the first type. The method may further include indicating to a logical pooled memory controller associated with the logical pooled memory that all pages associated with the logical pooled memory initially allocated to any of the plurality of compute entities are known-pattern pages. The method may further include the logical pooled memory controller tracking both a status of whether a page of the logical pooled memory allocated to any of the plurality of compute entities is a known-pattern page and a relationship between logical memory addresses and physical memory addresses associated with any allocated logical pooled memory to any of the plurality of compute entities. The method may further include in response to a write operation initiated by the compute entity, the logical pooled memory controller allowing writing of the data to any available space in the second physical memory of the first type only up to an extent of physical memory that corresponds to the portion of the logical pooled memory previously allocated to the compute entity.

In another example, the present disclosure relates to a system comprising a memory for use with a plurality of compute entities, where a portion of the memory comprises a combination of a portion of a first physical memory of a first type and a portion of a logical pooled memory associated with the system. The logical pooled memory may be mapped to a second physical memory of the first type and an amount of the logical pooled memory indicated as being available for allocation to the plurality of compute entities may be greater than an amount of the second physical memory of the first type. The system may further include a logical pooled memory controller, coupled to the logical pooled memory, configured to: (1) track both a status of whether a page of the logical pooled memory allocated to any of the plurality of compute entities is a known-pattern page and a relationship between logical memory addresses and physical memory addresses associated with any allocated logical pooled memory to any of the plurality of compute entities, and (2) in response to a write operation initiated by the compute entity to write any data other than a known-pattern, allow the write operation to write the data to any available space in the second physical memory of the first type only up to an extent of physical memory that corresponds to the portion of the logical pooled memory previously allocated to the compute entity.

In yet another example, the present disclosure relates to a system including a plurality of host servers configurable to execute one or more of a plurality of compute entities. The system may further include a memory, where a portion of the memory comprises a combination of a portion of a first physical memory of a first type and a portion of a logical pooled memory shared among the plurality of host servers. The logical pooled memory may be mapped to a second physical memory of the first type and an amount of the logical pooled memory indicated as being available for allocation to the plurality of compute entities may be greater than an amount of the second physical memory of the first type. The system may further include a logical pooled memory controller, coupled to the logical pooled memory associated with the system, configured to: (1) track both a status of whether a page of the logical pooled memory allocated to any of the plurality of compute entities is a known-pattern page and a relationship between logical memory addresses and physical memory addresses associated with any allocated logical pooled memory to any of the plurality of compute entities, and (2) in response to a write operation initiated by a compute entity, being executed by a processor associated with any of the plurality of host servers, to write any data other than a known pattern, allow the write operation to write the data to any available space in the second physical memory of the first type only up to an extent of physical memory that corresponds to the portion of the logical pooled memory previously allocated to the compute entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 8 shows a flow chart of an example method for oversubscribing physical memory for use with compute entities; and FIG. 9 shows a flow chart of another example method for oversubscribing physical memory for use with compute entities.

DETAILED DESCRIPTION

Figure 1:
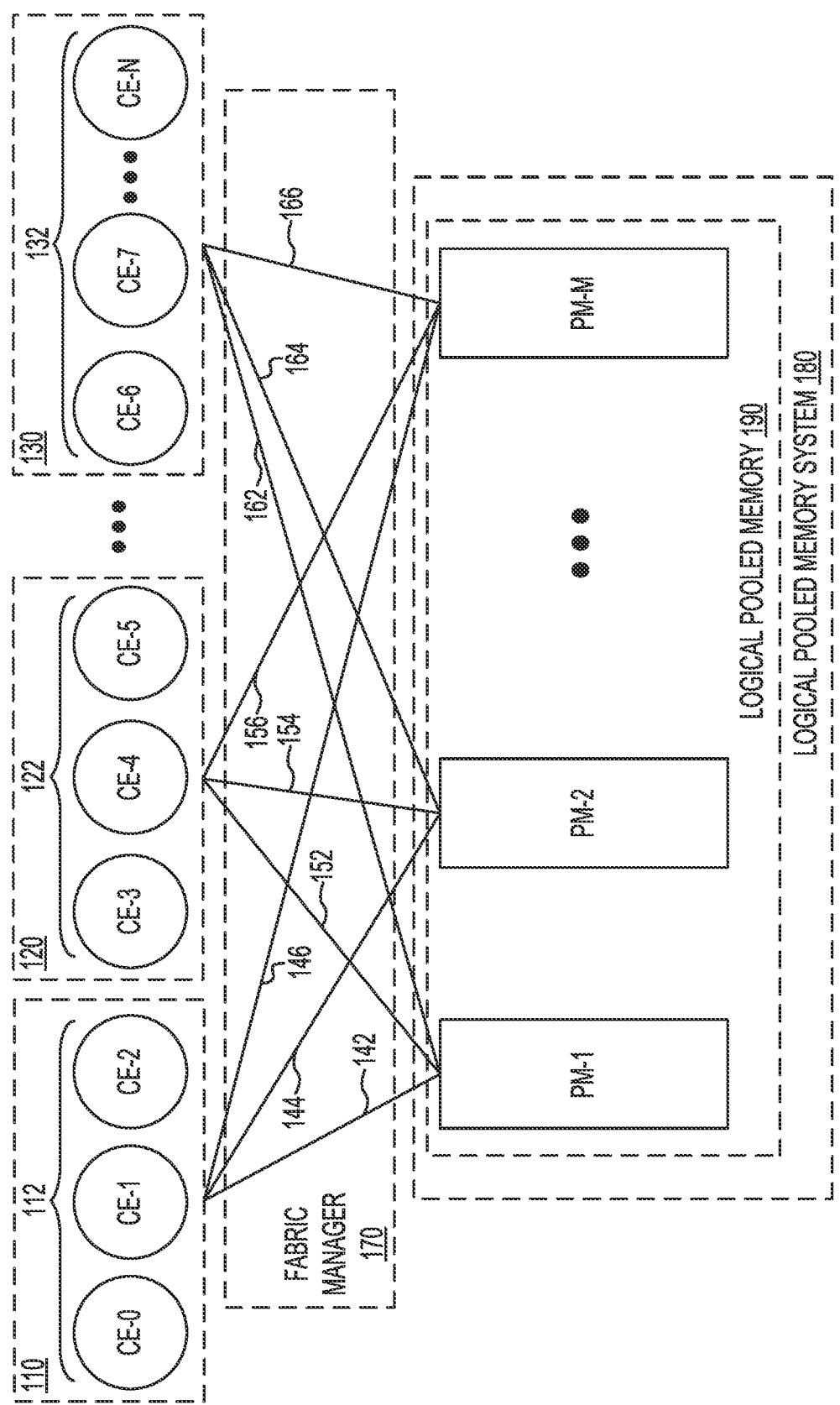
FIG. 1 is a block diagram of a system environment including host servers coupled with a logical pooled memory system in accordance with one example.

Examples described in this disclosure relate to memory reduction in a system by oversubscribing physical memory shared among compute entities supported by the system. Certain examples relate to oversubscribing physical memory for use with virtual machines in a multi-tenant computing system. The multi-tenant computing system may be a public cloud, a private cloud, or a hybrid cloud. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Compute entities may be executed using compute and memory resources of the data center. As used herein, the term "compute entity" encompasses, but is not limited to, any executable code (in the form of hardware, firmware, software, or in any combination of the foregoing) that implements a functionality, a virtual machine, an application, a service, a micro-service, a container, a unikernel for serverless computing, or a part of the aforementioned. Alternatively, compute entities may be executing on hardware associated with an edge-compute device, on-premises servers, or other types of systems, including communications systems, such as base stations (e.g., 5G or 6G base stations).

Consistent with the examples of the present disclosure, compute entities are allocated a combination of the local physical memory and the logical pooled memory with the assumption that the memory usage will typically be less than or equal to the memory allocated to a compute entity. This allows for the oversubscription of the installed memory in the system by the compute entities since more compute entities can be supported by the system without having to deploy additional physical memory. As an example, in a multi-tenant computing or communication system, each tenant is assigned some portion of the total system memory. It is observed that all tenants do not use their entire allocation of memory at the same time. Thus, as an example, the host servers in a data center may be allocated logical pooled memory exposed by a pooled memory system. Each of the VMs may be allocated a combination of the local physical memory on the host server and a fraction of the logical pooled memory available to the host server. The logical pooled memory may be a combination of physical pooled memory and known-pattern pages that are not backed by any physical memory. In sum, as used herein the term "logical pooled memory" refers to memory that includes overcommitted physical memory that is shared by a plurality of compute entities, which may correspond to a single host or multiple hosts. In this example, overcommitted means that the logical pooled memory has a smaller amount of physical memory than the total amount of memory that is indicated as being available to a compute entity. As used herein the term "known-pattern pages" refers to any pages that include only zeros, only ones, or some other known pattern of values or symbols. The VMs may use the local physical memory first and once that is in use, the VMs may access the fraction of the logical pooled memory. In a multi-tenant computing system, when all of the VMs are allocated memory in this fashion, they are unlikely to exhaust the entire allocation of the physical pooled memory backing the logical pooled memory. This is why the actual physical memory behind the logical pooled memory controller can be less than the logical pooled memory exposed to the host servers. This, in turn, may allow for reduction in the amount of the physical memory (e.g., DRAM) that needs to be deployed as part of the multi-tenant computing system or communication system.

Although with the above implementation of the logical pooled memory, some of the portion of the logical pooled memory will remain unused, it is difficult to predict which portion of the logical pooled memory will be unused at a given time. Indeed, different portions of the logical pooled memory may be in use at different times. Therefore, a mechanism is needed to flexibly map the pooled physical memory to the logical pooled memory space exposed to the compute entities such that logical pooled memory space that is in use is backed by the physical pooled memory while leaving the unused physical pooled memory unmapped. In certain examples, the mapping function may be performed using a page mapping table. Other mechanisms may also be used. In addition, in some instances the use of memory may further be optimized by compressing the data before storing the data into the physical pooled memory. If data compression is used, then the mapping function may further be modified to keep track of the compressed memory pages.

FIG. 1 is a block diagram of a system environment 100 including host servers (e.g., host servers 110, 120, and 130) coupled with a logical pooled memory system 150 in accordance with one example. Each host server may be configured to execute several compute entities. In this example, host server 110 may be executing compute entities 112 (e.g., CE-0, CE-1, and CE-2), host server 120 may be executing compute entities 122 (e.g., CE-3, CE-4, and CE-5), and host server 130 may be executing compute entities 132 (e.g., CE-6, CE-7, and CE-N). Logical pooled memory system 180 may include logical pooled memory 190, which may include several memory modules. Although not shown in FIG. 1, logical pooled memory system 180 may include a logical pooled memory controller (described later). As explained later in more detail, logical pooled memory 190 may include an address space that is larger than the physical memory configured to support the logical address space. In this example logical pooled memory 190 may include memory modules: PM-1, PM-2, and PM-M, where M is an integer greater than one. As used herein the term "memory modules" includes any memory that is based on a memory technology that can act as cacheable memory. Examples of such memory modules include, but are not limited to, dual-in-line memory modules (DIMMs) or single-in-line memory modules (SIMMs). As used herein the term "cacheable memory" includes any type of memory where the data obtained via a read operation associated with the memory can be copied to a memory cache such that the next time the same data is accessed, it can be obtained from the memory cache. Memory may be dynamic random access memory (DRAM), flash memory, static random access memory (SRAM), phase change memory, magnetic random access memory, or any other type of memory technology that can allow the memory to act as a cacheable memory.

With continued reference to FIG. 1, each of host servers 110, 120, and 130 may be coupled via links to memory modules included in logical pooled memory 190. As an example, host server 110 is shown as coupled with memory module PM-1 via link 142, coupled with memory module PM-2 via link 144, and coupled with memory module PM-3 via link 146. Host server 120 is shown as coupled with memory module PM-1 via link 152, coupled with memory module PM-2 via link 154, and coupled with memory module PM-3 via link 156. As another example, host server 130 is shown as coupled with memory module PM-1 via link 162, coupled with memory module PM-2 via link 164, and coupled with memory module PM-M via link 166.

Still referring to FIG. 1, in this example, fabric manager 170 may manage the assignment of memory ranges to respective host servers. A processor (e.g., a CPU) serving a compute entity may issue load or store instructions. The load or store instructions may result in a read or write to a local memory (e.g., a DRAM associated with a CPU of a host server configured to execute the compute entities) or a read/write to a memory module associated with logical pooled memory 190. In this example, a load or store instruction that results in a read/write to a memory module associated with logical pooled memory 190 may be translated by fabric manager 170 into a transaction that is completed using one of the links (e.g., link 142, 144, or 146). In one example, fabric manager 170 may be implemented using a fabric manager based on the Compute Express Link specification.

With continued reference to FIG. 1, compute entities 112, 122, and 132 may be served compute, storage, and networking resources using a set of clusters that may be included as part of a data center. As used in this disclosure, the term data center may include, but is not limited to, some or all of the data centers owned by a cloud service provider, some or all of the data centers owned and operated by a cloud service provider, some or all of the data centers owned by a cloud service provider that are operated by a customer of the service provider, any other combination of the data centers, a single data center, or even some clusters in a particular data center. In one example, each cluster may include several identical servers. Thus, a cluster may include servers including a certain number of CPU cores and a certain amount of memory. Alternatively, compute entities 112, 122, and 132 may be executing on hardware associated with an edge-compute device, on-premises servers, or other types of systems, including communications systems, such as base stations (e.g., 5G or 6G base stations). Although FIG. 1 shows system environment 100 as having a certain number of components, including compute entities and memory components, arranged in a certain manner, system environment 100 may include additional or fewer components, arranged differently.

Figure 2:
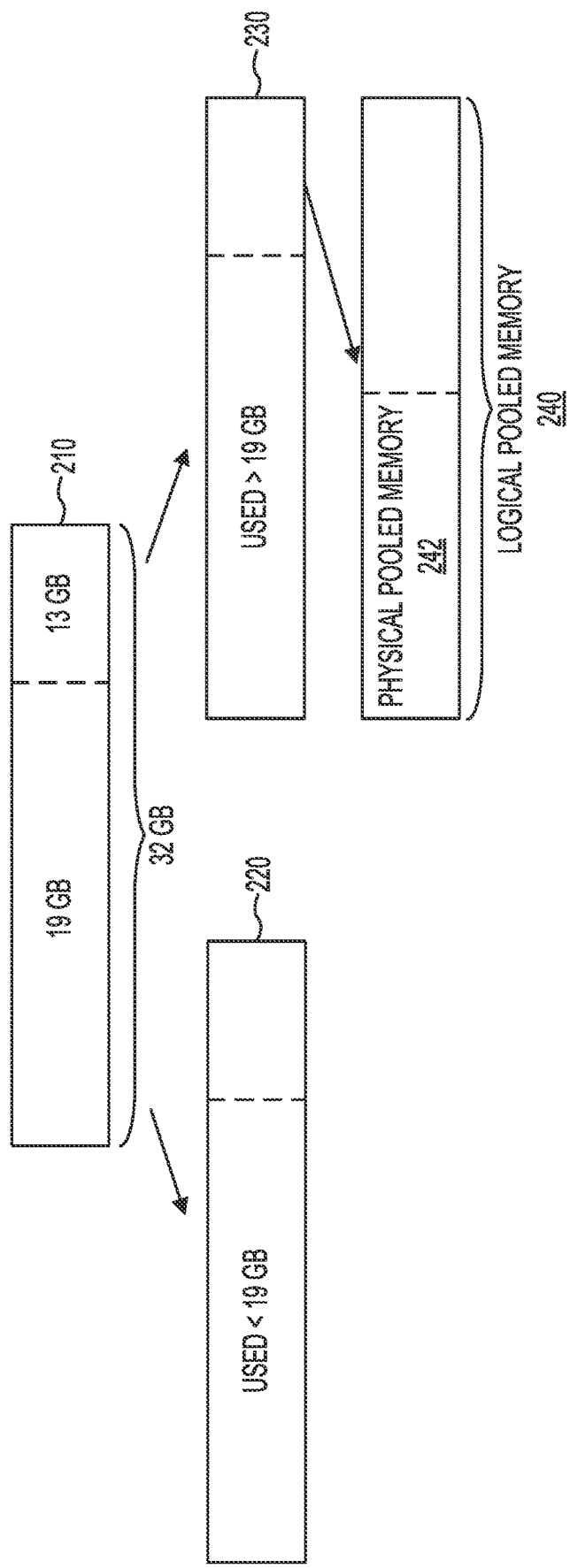
FIG. 2 shows an oversubscription process flow ordance with one example.

FIG. 2 shows an example of an oversubscription process flow. This example illustrates the oversubscription process using virtual machines (VMs) as example compute entities that are being executed using hardware associated with a host server. Moreover, this example assumes that the host server is located in a data center including clusters of host servers. This example further assumes that the clusters of host servers are part of a multi-tenant cloud. The oversubscription process, however, could be used in other settings, including when compute entities are executing on hardware associated with an edge-compute device, on-premises servers, or other types of systems, including communications systems, such as base stations (e.g., 5G or 6G base stations).

In response to a request from a user to initialize a VM, a VM scheduler may schedule a VM for execution using hardware resources associated with the host server. As part of this process, the VM may be allocated certain compute resources (e.g., CPU(s)) and memory (e.g., DRAM associated with the CPU(s)). The memory associated with a host server may be better utilized by using oversubscription alone or using oversubscription in combination with pooling. As an example, the memory may be oversubscribed with an expectation that in most use-cases, the VM will use only the memory that has been typically utilized by such a VM or predicted for use by such a VM. In one example, an average of the peak use by a VM may be allocated as the local physical memory to the VM. Thus, a certain amount of memory may be allocated to VMs knowing that such memory may not necessarily be available to such VMs, including, for example, in a peak usage or another high memory use scenario. Pooling may help with oversubscription and oversubscription may help with pooling when these two techniques are used together. This is because the memory from the pool may be used for VMs that had been allocated memory that was oversubscribed.

Still referring to FIG. 2, an example oversubscription process with respect to a request for a 32 GB memory (210) by a VM is shown. In this example, in response to this request, the hypervisor (or another coordinator for allocating resources to VMs) may allocate 19 GB of physical memory and 13 GB of memory that is mapped to a logical pooled memory. In this example, the allocation of 19 GB memory may be based on the predicted use of memory by the requesting VM. In this example, the pooled memory may have a logical pooled memory of 256 GB with physical pooled memory of 128 GB. In this manner, the 13 GB of memory that is mapped to the pool may or may not be available since the logical pooled memory of 256 GB is shared with other host servers supporting additional VMs. The VM having been allocated 19 GB of physical memory and 13 GB of logical memory that is mapped to the pooled memory may execute without placing any demand on the pooled memory as in most cases the memory actually used by the VM may be less than 19 GB (220). Alternatively, in rare cases, the VM's use of memory may exceed 19 GB (230). In such a case, additional memory may be allocated from physical pooled memory 262 out of logical pooled memory 260. As part of the oversubscription process, a high watermark may be associated with the use of physical pooled memory 262, such that when the use of this memory by the VMs approaches the high watermark, certain mitigation processes may be initiated. As an example, once the high watermark is reached, the logical pooled memory controller may start compressing pages before storing them in physical pooled memory 262. In another example, physical pooled memory 262 may be backed up by additional physical memory that may have a higher latency and thus it likely may be cheaper to deploy than the memory associated with physical pooled memory 262. In such a situation, once the high watermark is reached, pages may be written to the slower memory.

To ensure that the compute entity first uses the portion of the physical memory (e.g., 19 GB) allocated to it before using the portion of the logical pooled memory (e.g., 13 GB) allocated to it, a software mechanism may be used to enable the compute entity to distinguish between the physical memory and the logical pooled memory. In one example, to ensure better performance in host servers that support Non-Uniform Memory Access (NUMA) nodes, the pooled memory may be exposed as a compute-less virtual NUMA node to the VM. This in one for the VM to distinguish between the local physical memory and the logical pooled memory, which may have a higher latency. Accordingly, the VM may continue using the local physical memory first and then once that is exhausted it may start using the pooled memory exposed as the compute-less virtual NUMA node to the VM. Other mechanisms may also be used to allow the VM to differentiate between the local physical memory and the logical pooled memory. Although FIG. 2 describes the oversubscribing process with a total of 32 GB requested by the VM and a logical pooled memory of 256 GB, the VM may request additional or fewer amount of memory (e.g., anywhere between 4 GB to 128 GB). Similarly, the size of the logical pooled memory may be smaller or bigger depending upon the number of compute entities being served by a computing system. Moreover, although FIG. 2 describes the amount of local physical memory as 19 GB and the logical pooled memory as 13 GB, these amounts may vary among compute entities. In addition, the oversubscription process does not require pooling of the memory among the host servers (or other systems), it only requires a plurality of compute entities sharing the logical pooled memory.

Figure 3:
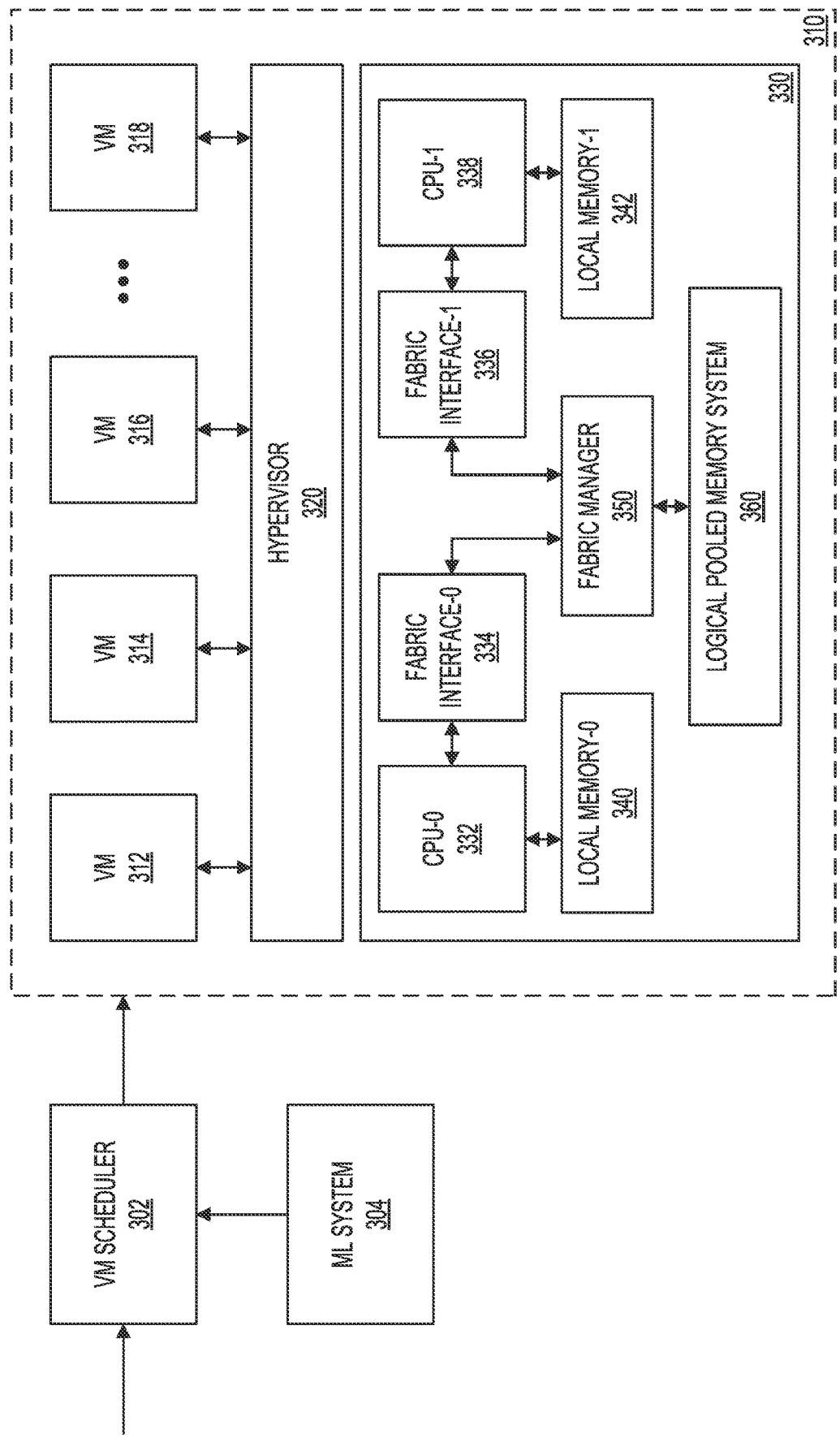
FIG. 3 is a block diagram of a system including a VM scheduler, a machine learning (ML) system, and a host server including a logical pooled memory system configured to allow for oversubscription in accordance with one example.

FIG. 3 is a block diagram of a system 300 including a VM scheduler 302, a machine learning (ML) system 304, and a host server 310 including resources 330 configured to allow for oversubscription in accordance with one example. Host server 310 may also include a hypervisor 320, compute resources (e.g., CPU-0 332 and CPU-1 338), local memory resources (e.g., local memory-0 340 and local memory-1 342), a fabric manager 350, and logical pooled memory system 360. VM scheduler 302 may be configured to receive requests for VMs from any of tenants associated with a multi-tenant cloud and schedule the placement of the VMs (e.g., VM 312, VM 314, VM 316, and VM 318 on host server 310). In this example, each of resources 330 may be implemented as a hardware component, such as using one or more of SoCs, controllers, processing cores, memory modules, ASICs, FPGAs, CPLDs, PLAs, silicon IP, and the like. Moreover, in this example, the functionality associated with each of VM scheduler 302, ML system 304, and hypervisor 320 may be implemented via instructions, when executed by a processor, that are stored in a non-transitory media. Although FIG. 3 describes system 300 with respect to VMs, other compute entities may also be used with system 300 in a similar manner. In addition, VM scheduler 302 may be configured to handle requests from compute entities included in an edge-compute device, on-premises servers, or other types of systems, including communications systems, such as base stations (e.g., 5G or 6G base stations).

ML system 304 may be configured to provide resource predictions, including predicted memory usage, to VM scheduler 302. A request to deploy a set of VMs may arrive at VM scheduler 302. In this example, VM scheduler 302 may then send a query to ML system 304 to request predicted memory usage. ML system 304 may provide memory usage predictions. Using these predictions, VM scheduler 302 may allocate memory resources to VMs. Alternatively, VM scheduler 302 may have been provided memory usage predictions or other memory usage information such that the VM scheduler 302 need not query ML system 304 every time a VM needs to be placed or scheduled for execution. As explained earlier with respect to FIG. 2, the allocated memory may be a combination of physical memory (e.g., local DRAM) and a mapping to a logical pooled memory.

With continued reference to FIG. 3, ML system 304 may include several components having instructions configured to perform various functions associated with ML system 304. ML system 304 may include both offline training components and online prediction components. Offline training components may be responsible for training of the various machine language models, validating the models, and publishing the validated models. Online prediction components may generate predictions concerning various aspects, including predictions related to memory usage by VMs and any behavior patterns associated with the VMs. Prior to training the ML models, features that allow the ML models to predict a metric based on the inputs may be selected. The training phase may include using backward propagation, or other techniques, allowing the ML models to learn a relationship between certain input parameters and certain predictions based on the parameters. As an example, neural network models trained using stochastic gradient descent may be used to predict memory usage for a compute entity, such as a VM. Other types of ML models, including Bayesian models may be used.

In general, one may implement a supervised learning algorithm that can be trained based on input data and once it is trained it can make predictions or prescriptions based on the training. Any of the learning and inference techniques such as Linear Regression, Support Vector Machine (SVM) set up for regression, Random Forest set up for regression, Gradient-boosting trees set up for regression and neural networks may be used. Linear regression may include modeling the past relationship between independent variables and dependent output variables. Neural networks may include artificial neurons used to create an input layer, one or more hidden layers, and an output layer. Each layer may be encoded as matrices or vectors of weights expressed in the form of coefficients or constants that might have been obtained via off-line training of the neural network. Neural networks may be implemented as Recurrent Neural Networks (RNNs), Long Short Term Memory (LSTM) neural networks, or Gated Recurrent Unit (GRUs). All of the information required by a supervised learning-based model may be translated into vector representations corresponding to any of these techniques.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In the case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}+W_{hi}h_{t-1}+W_{ci}c_{t-1}+b_i)$$

$$f_t = \sigma(W_{xf}x_t+W_{hf}h_{t-1}+W_{cf}c_{t-1}+b_f)$$

$$c_t = f_t c_{t-1} i_t \tanh(W_{xc}x_t+W_{hc}h_{t-1}+b_c)$$

$$o_t = \sigma(W_{xo}t+W_{ho}h_{t-1}+W_{co}c_t+b_o)$$

$$h_t o_t \tanh(c_t)$$

In this example, inside each LSTM layer, the inputs and hidden states may be processed using a combination of vector operations (e.g., dot-product, inner product, or vector addition) or non-linear operations, if needed. The instructions corresponding to the machine learning system could be encoded as hardware corresponding to an A/l processor. In this case, some or all of the functionality associated with ML system 304 may be hard-coded or otherwise provided as part of an AII processor. As an example, an A/l processor may be implemented using an FPGA with the requisite functionality.

In another example, the memory allocated to a VM may be dynamically changed or determined. As an example, the behavior change may correspond to the workloads served by the VM over time and that may be used to dynamically change the memory allocation. One example of the behavior change may relate to VMs that service web-searching workloads or other similar workloads. Such VMs may have diurnal patterns, such that the workloads require more resources during the day, but not so much during the night. In one example, using the Fast Fourier Transform (FFT) algorithm one may detect periodicity of the behavior associated with the VMs. The FFT may be used to detect periodicity at multiple time scales, but a VM's memory allocation may only be dynamically changed when the workloads handled by the VM has a periodicity consistent with certain patterns, e.g., diurnal patterns. The periodicity analysis may produce ground-truth labels that can also be used in training an ML model to predict that a VM will likely execute a diurnal pattern or another pattern. In another example other features (e.g., cloud subscription ID, the user who created the VM, VM type, VM size, and the guest operating system) may also be used to statically or dynamically change the extent of the physical memory and the pooled memory allocated to a VM.

In yet another example, instead of predicting memory usage or determining behavior/sage patterns, the VMs may be allocated exclusively the local physical memory in response to a request for scheduling the VM. At a later time, as the local physical memory associated with the host server (or a collection of host servers) starts to reach a certain utilization level, the scheduled VM may be allocated a combination of the local physical memory and the mapped logical pooled memory. In this manner, memory may be dynamically allocated to a VM that is being currently executed.

Still referring to FIG. 3, hypervisor 320 may manage the virtual machines, including VMs 312, 314, 316, and 318. CPU-0 332 may include one or more processing cores and CPU-1 338 may include one or more processing cores. Instructions corresponding to hypervisor 320, when executed by any of the processing cores, may provide the management functionality provided by hypervisor 320. Hypervisor 320 may ensure that any threads associated with any given VM are scheduled only on the logical cores of its group. CPU-0 332 may be coupled to a local memory-0 340 and CPU-1 338 may be coupled to another local memory-1 342. Each of local memory-0 340 and local memory-1 342 may include one or more memory modules. Examples of such memory modules include, but are not limited to, dual-in-line memory modules (DIMMs) or single-in-line memory modules (SIMMs). Any memory type that is a "cacheable memory" may be used to implement the memory modules. As used herein the term "cacheable memory" includes any type of memory where the data obtained via a read operation associated with the memory can be copied to a memory cache such that the next time the same data is accessed, it can be obtained from the memory cache. Memory may be dynamic random access memory (DRAM), flash memory, static random access memory (SRAM), phase change memory, magnetic random access memory, or any other type of memory technology that can allow the memory to act as a cacheable memory.

With continued reference to FIG. 3, in this example, CPU-0 332 may be coupled to fabric manager 350 via a fabric interface-0 334 and CPU-1 338 may be coupled to fabric manager 350 via another fabric interface-1 336. Fabric manager 350 may allow any of the VMs being executed by processing cores associated with CPU-0 332 and CPU-1 338 to access logical pooled memory system 360. In one example, any of the CPUs associated with host server 310 may issue load or store instructions to the logical address space set up by hypervisor 320. The load or store instructions may result in a read or write to a local memory (e.g., either local memory-0 340 or local memory-1 342 depending on the CPU issuing load or store instructions) or a read/write transaction associated with logical pooled memory system 360. In one example, assuming the local memory is DRAM, any of the relevant double-data rate (DDR) protocols associated with accessing DRAMs may be used by the CPUs to read/write the local memory. In this example, a load or store instruction that results in a read/write to a memory module associated with logical pooled memory system 360 may be translated by fabric manager 350 (or another similar sub-system) into a transaction that is completed using any of the links coupling the VMs with memory associated with logical pooled memory system 360. The read/write transactions may be executed using a protocol associated with fabric manager 350 and logical pooled memory system 360. The memory modules associated with logical pooled memory system 360 when implemented as DRAM memory modules may be accessed by a controller associated with logical pooled memory system 360 using any of the relevant DDR protocols.

In one example, fabric manager 350 may be implemented using a fabric manager based on the Compute Express Link (CXL) specification. In this example, memory modules associated with logical pooled memory system 360 may be configured as Type 3 CXL devices. The logical address space exposed by hypervisor 320 to the virtual machines may be at least a subset of the address range exposed by a controller associated with the CXL bus/links. Thus, as part of this example, transactions associated with CXL.io protocol, which is a PCIe-based non coherent I/O protocol, may be used to configure the memory devices and the links between the CPUs and the memory modules included in logical pooled memory system 360. The CXL.io protocol may also be used by the CPUs associated with host server 310 in device discovery, enumeration, error reporting, and management. Alternatively, any other I/O protocol that supports such configuration transactions may also be used. The memory access to the memory modules may be handled via the transactions associated with CXL.mem protocol, which is a memory access protocol that supports memory transactions. As an example, load instructions and store instructions associated with any of the CPUs of host server 310 may be handled via CXL.mem protocol. Alternatively, any other protocols that allow the translation of the CPU load/store instructions into read/write transactions associated with memory modules included in logical pooled memory system 360 may also be used. Although FIG. 3 shows host server 310 including certain components arranged in a certain manner, host server 310 may include additional or fewer components, arranged differently. As an example, although FIG. 3 shows local memory coupled to the CPUs, no local memory may be coupled to the CPUs. Instead, the CPUs may access memory associated with logical pooled memory system 360 only. In addition, although FIG. 3 shows the VMs hosted by a single host server, VMs 312, 314, 316, and 318 may be hosted using a group of host servers (e.g., a cluster of host servers in a data center). Logical pooled memory system 360 may be shared across the host servers or may be dedicated for each host server.

Figure 4:
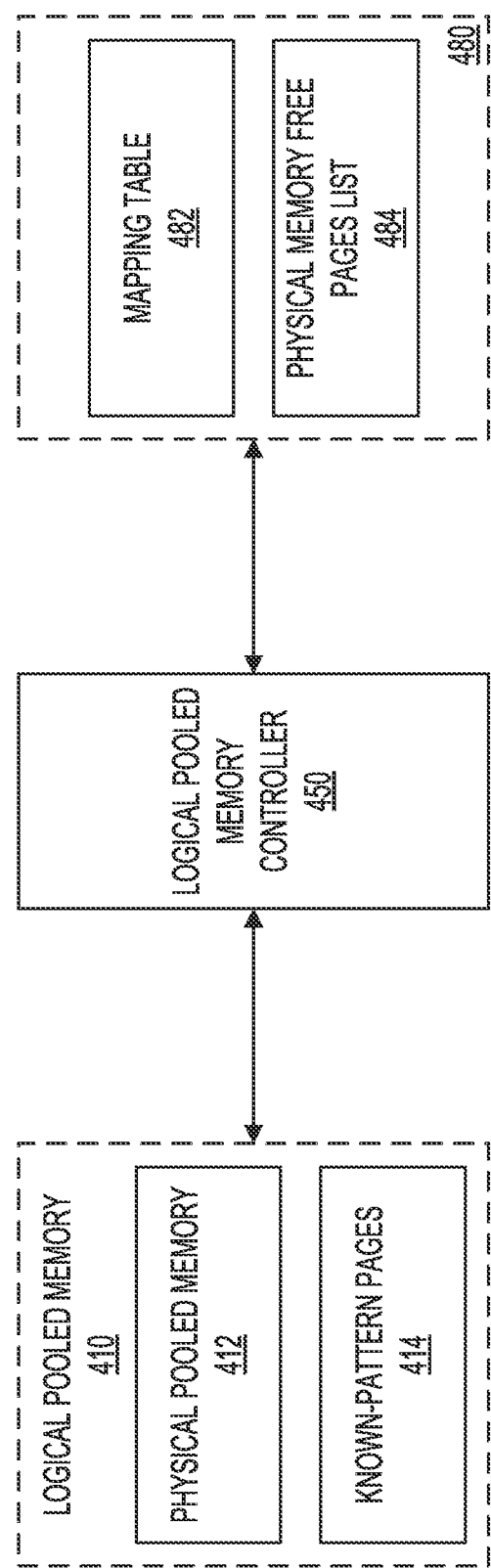
FIG. 4 is a block diagram of a logical pooled memory system configured to allow for oversubscription of memory in accordance with one example.

FIG. 4 is a block diagram of a logical pooled memory system 400 configured to allow for oversubscription of memory in accordance with one example. In one example, logical pooled memory system 360 of FIG. 3 may be implemented as logical pooled memory system 400. In this example, logical pooled memory system 400 may include logical pooled memory 410, a logical pooled memory controller 450, and pooled memory control structures 480. Logical pooled memory 410 may include physical pooled memory 412 and known-pattern pages 414. Physical pooled memory 412 may include memory modules with physical memory (e.g., DRAM). Physical pooled memory 412 may correspond to a logical address space. Known-pattern pages 414 may represent the logical address space that is not backed by any physical memory. Logical pooled memory controller 450 may manage access to logical pooled memory 410 by interacting with pooled memory control structures 480. Logical pooled memory controller 450 may be implemented as any combination of hardware, firmware, or software instructions. Instructions corresponding to logical pooled memory controller 450 may be stored in a memory associated with logical pooled memory system 400. Such instructions when executed by a processor associated with logical pooled memory system 400 may provide at least some of the functionality associated with logical pooled memory controller 450. Other functionality may be provided by the control logic associated with logical pooled memory controller 450, including finite state machines and other logic.

In this example, pooled memory control structures 480 may include a mapping table 482 and a physical memory free pages list 484. Both mapping table 482 and physical memory free pages list 484 may be stored in physical pooled memory 412 or another memory (e.g., a cache associated with logical pooled memory controller 450). Mapping table 482 may maintain a mapping between the logical address space and the physical address space associated with physical pooled memory 412. Mapping table 482 may also keep track of the status of pages in terms of whether a page is a known-pattern page or not. A known-pattern page may not have any allocated physical space as part of physical pooled memory 412. In this example, the physical memory addresses associated with known-pattern pages are considered invalid (identified as not-applicable (N/A) in mapping table 482. If compression is used to free up additional space in physical pooled memory 412, then it can also be tracked using mapping table 482. Table 1 below shows an example mapping table 482.

TABLE 1

| PAGE NUMBER | KNOWN-PATTERN PAGE | COMPRESSED | PHYSICAL MEMORY ADDRESS |
|---|---|---|---|
| 0 | 1 | 0 | N/A |
| 1 | 0 | 0 | ADDR-10 |
| 2 | 1 | 0 | N/A |
| 3 | 0 | 1 | ADDR-112 |
| . | . | 0 | . |
| . | . | . | . |
| . | . | . | . |
| 4095 | 0 | 0 | ADDR-515 |

As shown above in Table 1, mapping table 482 may be indexed by page numbers. A known-pattern page indicator (e.g., KNOWN-PATTERN PAGE flag) may be associated with each page. A logic high value (e.g., 1) may indicate to logical pooled memory controller 450 that no physical memory space has been allocated in physical pooled memory 412 corresponding to the page number. A logic low value (e.g., 0) may indicate to logical pooled memory controller 450 that physical memory space has been allocated in physical pooled memory 412 corresponding to the page number. Logical pooled memory controller 450 may modify the known-pattern page indicator based on any status change associated with a page number. At the point of scheduling or creation of a VM, the hypervisor (or the host operating system) may map some of the memory for the VM to the physical memory associated with the host server and rest to logical pooled memory 410. At this time, the hypervisor (or the operating system) may issue a command to logical pooled memory controller 450 to set the known-pattern page indicator to a logic high value (e.g., 1) for the pages associated with the logical pooled memory allocated to the VM. The VM may also write a known-pattern to the logical pooled memory allocated to it at the time the VM is initialized. Logical pooled memory controller 450 may detect the write operation that is writing a known pattern as an indication that no physical memory needs to be allocated to the VM at this point. In addition, logical pooled memory controller 450 may ensure that the known-pattern page indicator for the corresponding pages is accurately reflected in mapping table 482.

At the outset, logical pooled memory controller 450 may map all of the logical pooled memory for the VM to known-pattern pages 414. A newly scheduled VM may also work with the hypervisor to ensure that any pages corresponding to logical pooled memory 410 allocated to the VM are identified as known-pattern pages in mapping table 482. At a later time, when the VM has used up all of the local physical memory allocated to it and it starts writing a not known-pattern (e.g., non-zeros) to the logical memory address space, then the logical pooled memory controller 450 may start allocating pages from within the logical address space (exposed by logical pooled memory controller 450) corresponding to physical pooled memory 412 to the VM. Physical memory free pages list 484 may include a list of pages corresponding to physical pooled memory 412 that are free and are not mapped by mapping table 482. Table 2 below shows an example physical memory free pages list 484. This example lists the pages corresponding to physical pooled memory 412 that are free to be allocated.

TABLE 2

PHYSICAL MEMORY FREE LIST

| 1024 |
| 1025 |
| 1029 |
| 1065 |
| . |
| . |
| . |
| 4055 |

Although the address translation is described as a single-level address translation, the address translation may be a multi-level address translation, and thus, it may require the use of additional mapping tables. In any case, logical pooled memory controller 450 may be configured to maintain the mapping tables and ensure proper tracking of the known-pattern pages to allow for the pooling and the oversubscription of memory allocated to VMs, as described earlier. Moreover, although mapping table 482 is described in relation to pages, other groupings of memory, including memory blocks, may also be used with mapping table 482. Also, the functionality of mapping table 482 may be implemented using registers or other similar hardware structures associated with processors and controllers. In addition, although mapping table 482 is described as being stored in physical pooled memory 412, at least a portion of the mapping table may be stored in a cache associated with logical pooled memory controller 450 to speed up the address translation process.

Figure 5:
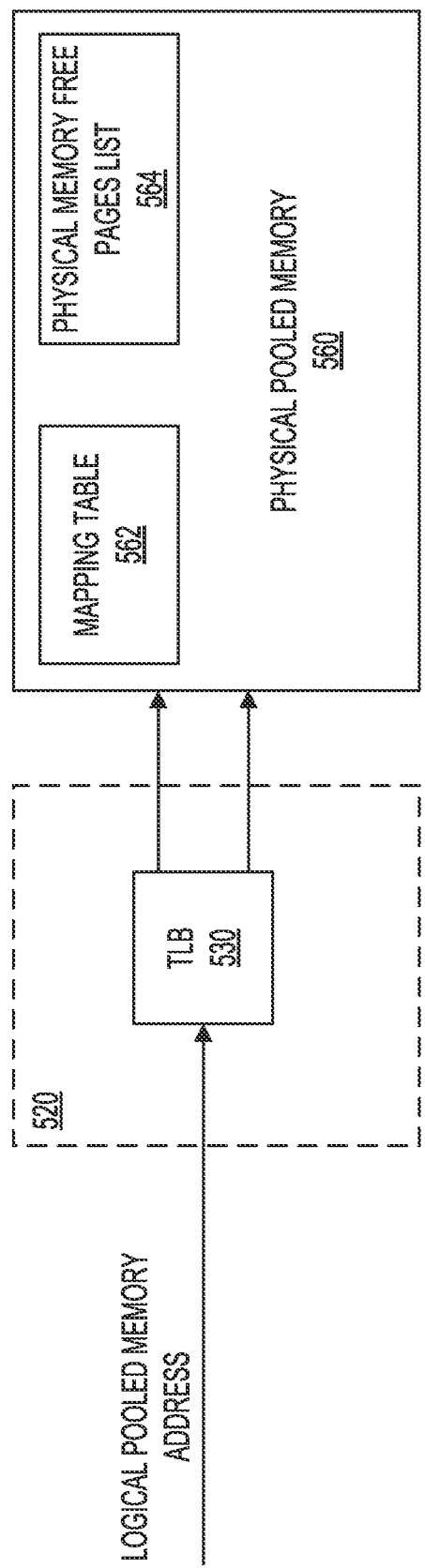
FIG. 5 shows a diagram of an example implementation of the mapping table using a translation look-aside buffer (TLB) in accordance with one example.

FIG. 5 shows a diagram of an implementation of the mapping table using a translation look-aside buffer (TLB) 530 in accordance with one example. As explained earlier with respect to FIG. 4, mapping table 482 may be used by logical pooled memory controller 450 to translate logical addresses received from a hypervisor (or another source) into physical addresses associated with physical pooled memory 412. In this example, logical pooled memory controller 520 may include a cache implemented as a translation lookaside buffer (TLB) 530. TLB 530 may be implemented as a content-addressable memory (CAM), a fully-associative cache, a two-way set-associative cache, a direct mapped cache, or another type of suitable cache. TLB 530 may be implemented to accomplish both for translation of the logical pooled addresses to the physical pooled memory addresses and for checking the known-pattern page status of the pages. For each address translation request, logical pooled memory controller 520 may first check TLB 530 to determine if the address translation is already cached. If the address translation is found cached in TLB 530, a TLB HIT signal may be generated. In addition, the physical address corresponding to the page number that resulted in the TLB HIT signal may be provided to physical pooled memory 560 to allow for access to the data or instructions stored at the physical address. Alternatively, if the address translation had not been cached, the TLB MISS signal may be generated. This, in turn, may result in a table walk through mapping table 562 unless the known-pattern page flag is set to a logical true value. As shown in FIG. 5, physical memory free pages list 564 may also be stored in physical pooled memory 560.

Figure 6:
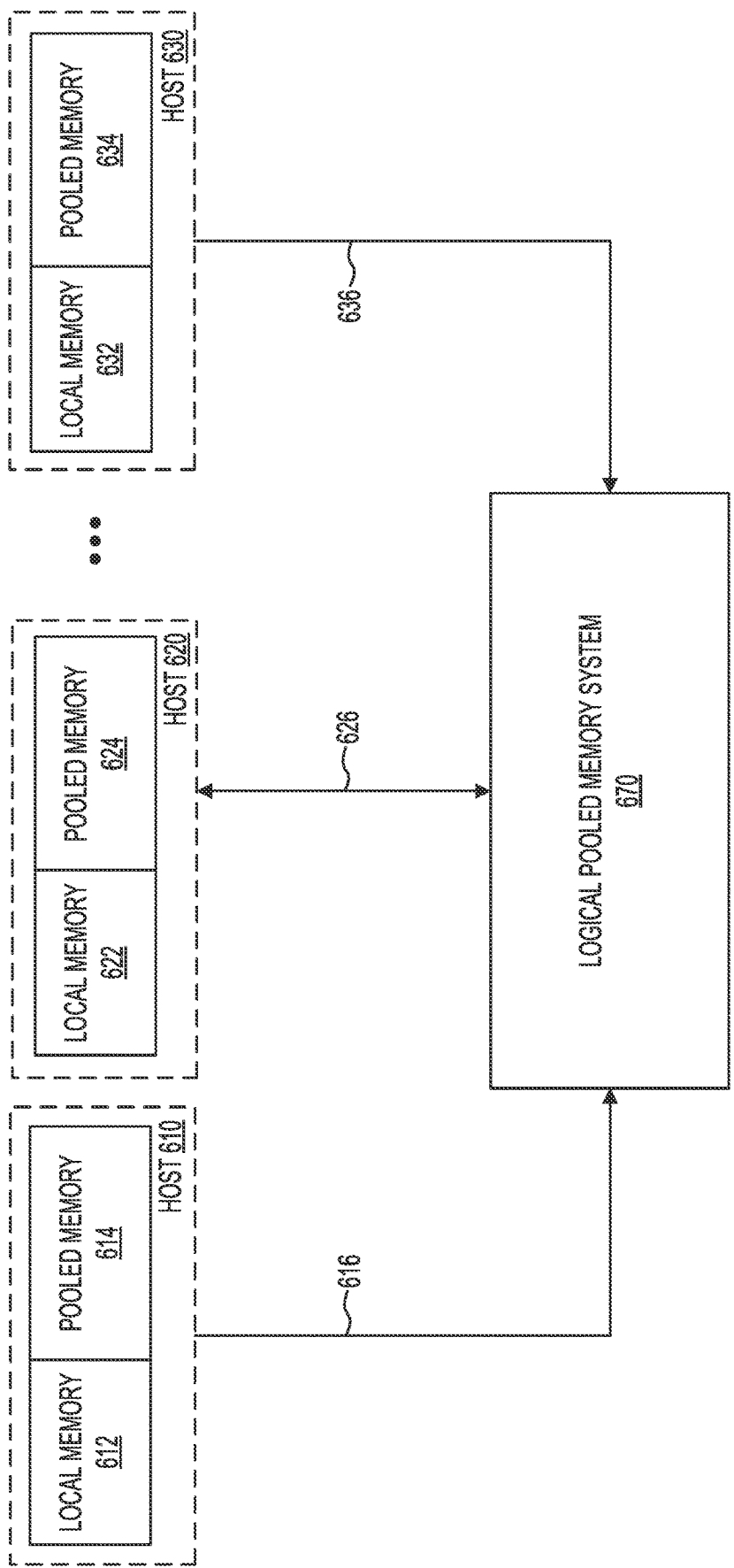
FIG. 6 shows a block diagram of an example system including multiple host servers coupled with a logical pooled memory system configured to allow for oversubscription of memory.

FIG. 6 shows a block diagram of a system 600 including multiple host servers coupled with a logical pooled memory system 670 configured to allow for oversubscription of memory. System 600 may include host server 610, host server 620, and host server 630 coupled to a logical pooled memory system 670. As explained earlier, each host server may host multiple compute entities (e.g., VMs), which in turn may have been purchased or otherwise paid for by different tenants of system 600. Each server may include local memory (e.g. memory modules described with respect to host server 310 of FIG. 3) and may have access to logical pooled memory, which may be a portion of the logical pooled memory included in logical pooled memory system 670. As described earlier, a fabric manager (implemented based on the CXL specification) may expose a subset of the logical pooled memory associated with logical pooled memory system 670 to each of hosts 610, 620, and 630. Logical pooled memory system 670 may be implemented in a similar manner as described earlier.

Each of the compute entities that has been scheduled or otherwise made available via host server 610 to a tenant may be allocated a portion of local memory 612 and a portion of pooled memory 614. As described earlier the allocation to each compute entity may be based on an oversubscription to the logical pooled memory managed by logical pooled memory system 670. In this example, each compute entity hosted by host server 610 may be coupled via a link 616 (or a collection of links) to logical pooled memory system 670. Each of the compute entities that has been scheduled or otherwise made available via host server 620 to a tenant may be allocated a portion of local memory 622 and a portion of pooled memory 624. As described earlier the allocation to each compute entity hosted by host server 620 may be based on an oversubscription to the logical pooled memory managed by logical pooled memory system 670. In this example, each compute entity hosted by host server 620 may be coupled via a link 626 (or a collection of links) to logical pooled memory system 670. Each of the compute entities that has been scheduled or otherwise made available via host server 630 to a tenant may be allocated a portion of local memory 632 and a portion of pooled memory 634. As described earlier the allocation to each compute entity hosted by host server 630 may be based on an oversubscription to the logical pooled memory managed by logical pooled memory system 670. In this example, each compute entity hosted by host server 630 may be coupled via a link 636 (or a collection of links) to logical pooled memory system 670. As an example, load and store instructions associated with any of the CPUs of each of host servers 610, 620, and 630 may be handled via CXL.mem protocol. Alternatively, any other protocols that allow the translation of the CPU load/store instructions into read/write transactions associated with memory modules included in logical pooled memory system 670 may also be used. Although FIG. 6 shows system 600 as including certain components arranged in a certain manner, system 600 may include additional or fewer components, arranged differently.

Figure 7:
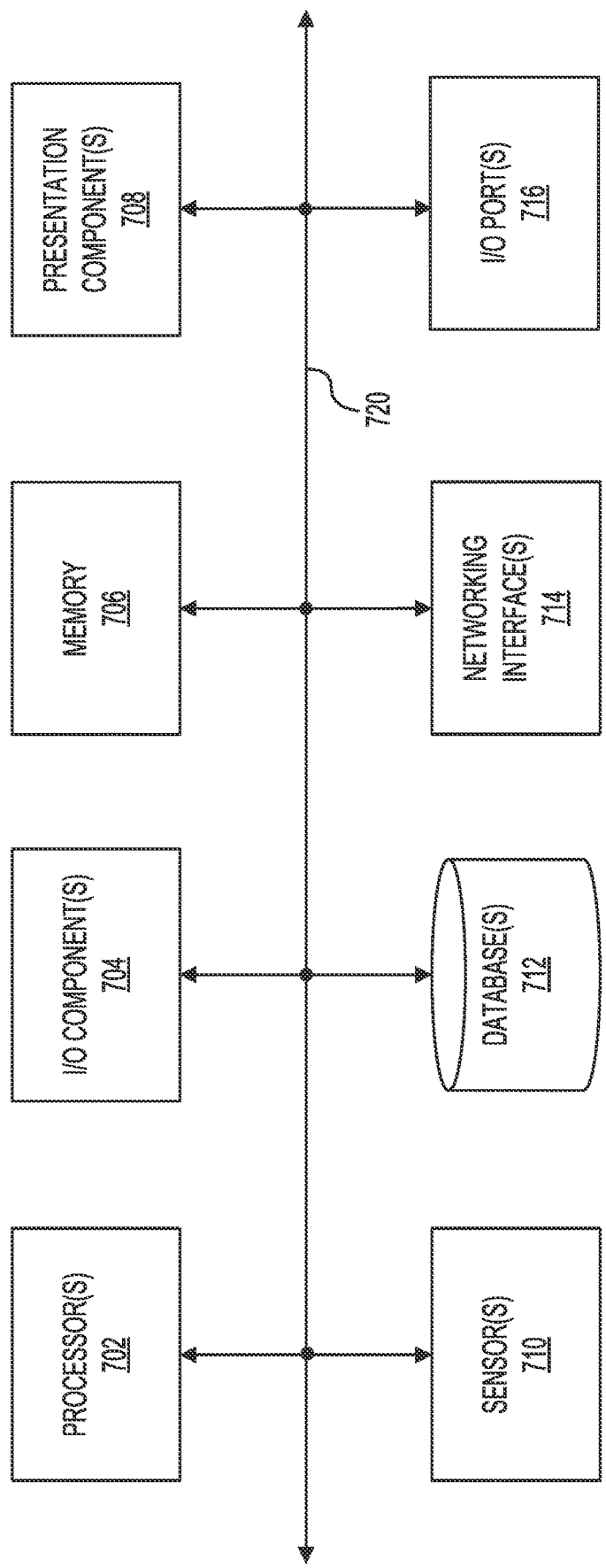
FIG. 7 shows a block diagram of an example system for implementing at least some of the methods for allowing oversubscription of the pooled memory allocated to compute entities.

FIG. 7 shows a block diagram of a system 700 for implementing at least some of the methods for allowing oversubscription of the pooled memory allocated to compute entities. System 700 may include processor(s) 702, I/O component(s) 704, memory 706, presentation component(s) 708, sensors 710, database(s) 712, networking interfaces 714, and I/O port(s) 716, which may be interconnected via bus 720. Processor(s) 702 may execute instructions stored in memory 706. I/O component(s) 704 may include components such as a keyboard, a mouse, a voice recognition processor, or touch screens. Memory 706 may be any combination of non-volatile storage or volatile storage (e.g., flash memory, DRAM, SRAM, or other types of memories). Presentation component(s) 708 may include displays, holographic devices, or other presentation devices. Displays may be any type of display, such as LCD, LED, or other types of display. Sensor(s) 710 may include telemetry or other types of sensors configured to detect, and/or receive, information (e.g., collected data). Sensor(s) 710 may include telemetry or other types of sensors configured to detect, and/or receive, information (e.g., memory usage by various compute entities being executed by host servers in a data center). Sensor(s) 710 may include sensors configured to sense conditions associated with CPUs, memory or other storage components, FPGAs, motherboards, baseboard management controllers, or the like. Sensor(s) 710 may also include sensors configured to sense conditions associated with racks, chassis, fans, power supply units (PSUs), or the like. Sensor(s) 710 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

Still referring to FIG. 7, database(s) 712 may be used to store any of the data collected or logged and as needed for the performance of methods described herein. Database(s) 712 may be implemented as a collection of distributed databases or as a single database. Network interface(s) 714 may include communication interfaces, such as Ethernet, cellular radio, Bluetooth radio, UWB radio, or other types of wireless or wired communication interfaces. I/O port(s) 716 may include Ethernet ports, Fiber-optic ports, wireless ports, or other communication or diagnostic ports. Although Fla 7 shows system 700 as including a certain number of components arranged and coupled in a certain way, it may include fewer or additional components arranged and coupled differently. In addition, the functionality associated with system 700 may be distributed, as needed.

FIG. 8 shows a flow chart 800 of an example method for oversubscribing physical memory for use with compute entities. In one example, steps associated with this method may be executed by various components of the systems described earlier. Step 810 may include allocating a portion of a memory associated with a system to a compute entity, where the portion of the memory comprises a combination of a portion of a first physical memory of a first type and a portion of a logical pooled memory associated with the system. The logical pooled memory is mapped to a second physical memory of the first type and an amount of the logical pooled memory indicated as being available for allocation to the plurality of compute entities is greater than an amount of the second physical memory of the first type. As described earlier with respect to FIG. 2, a virtual machine, which is one type of compute entity, may be allocated 19 GB of physical memory (e.g., memory modules, including DRAM configured as local memory for the CPUs) and 13 GB of logical pooled memory, which may be part of logical pooled memory 260 of FIG. 2 including physical pooled memory 262 of FIG. 2, which also may be memory modules, including DRAM. As used herein the term "type" used in the phrase "first type" refers to whether the memory is a cacheable memory type or not. As described earlier, the term "cacheable memory" includes any type of memory where the data obtained via a read operation associated with the memory can be copied to a memory cache such that the next time the same data is accessed, it can be obtained from the memory cache. Memory may be dynamic random access memory (DRAM), flash memory, static random access memory (SRAM), phase change memory, magnetic random access memory, or any other type of memory technology that can allow the memory to act as a cacheable memory. In sum, the first physical memory of the first type and the second physical memory of the first type need to be of the cacheable type, but they could be different type in other ways (e.g., DRAM vs. phase change memory or SRAM vs. DRAM).

Step 820 may include indicating to a logical pooled memory controller associated with the logical pooled memory that all pages associated with the logical pooled memory initially allocated to any of the plurality of compute entities are known-pattern pages. As an example, a hypervisor (e.g., hypervisor 320 of FIG. 3) may indicate to the logical pooled memory controller (e.g., logical pooled memory controller 450 of FIG. 4) the status of initially allocated page as known-pattern pages (e.g., known-pattern pages 414).

Step 830 may include the logical pooled memory controller tracking both a status of whether a page of the logical pooled memory allocated to any of the plurality of compute entities is a known-pattern page and a relationship between logical memory addresses and physical memory addresses associated with any allocated logical pooled memory to any of the plurality of compute entities. In this example, as part of this step, as explained earlier with respect to FIGs. 4 and 5, logical pooled memory controller (e.g., logical pooled memory controller 450 of FIG. 4) may track the status of pages (a known-pattern page or not) and the relationship between page numbers and physical addresses in the physical memory (e.g., physical pooled memory 412 of FIG. 4) using a mapping table (e.g., mapping table 482 of FIG. 4). As explained earlier, to speed up the access to the logical pooled memory at least a portion of the mapping table may be implemented as a translation lookaside buffer. In addition, the mapping table (or a similar structure) may be implemented using registers.

Step 840 may include in response to a write operation initiated by the compute entity, the logical pooled memory controller allowing writing of the data to any available space in the second physical memory of the first type only up to an extent of physical memory that corresponds to the portion of the logical pooled memory previously allocated to the compute entity. As explained earlier, when a compute entity (e.g., a VM) has used up all of the local physical memory allocated to it and it starts writing an unknown pattern to the logical memory address space, then the hypervisor may start allocating pages from within the logical address space (exposed by logical pooled memory controller 450) corresponding to physical memory (e.g., physical pooled memory 412 of FIG. 4) to the compute entity. The logical pooled memory controller may access a free pages list (e.g., physical memory free pages list 484 of FIG. 4) to access pages that are free and are not mapped by the mapping table. In addition, as explained earlier, the compute entity may not be allocated more physical memory managed by the logical pooled memory controller than previously allocated to the compute entity (e.g., 13 GB in the example described with respect to FIG. 2). This method may allow for the oversubscription of the installed memory in the system by the compute entities since more compute entities can be supported by the system without having to deploy additional physical memory (e.g., DRAM).

FIG. 9 shows a flow chart 900 of another example method for oversubscribing physical memory for use with compute entities. In one example, steps associated with this method may be executed by various components of the systems described earlier. Step 910 may include allocating a portion of a memory associated with a system to a compute entity, where the portion of the memory comprises a combination of a portion of a first physical memory of a first type and a portion of a logical pooled memory associated with the system. The logical pooled memory may be mapped to a second physical pooled memory of the first type and an amount of the logical pooled memory indicated as being available for allocation to the plurality of compute entities may be greater than an amount of the second physical pooled memory of the first type. As described earlier with respect to FIG. 2, a virtual machine, which is one type of compute entity, may be allocated 19 GB of physical memory (e.g., memory modules, including DRAM configured as local memory for the CPUs) and 13 GB of logical pooled memory, which may be part of logical pooled memory 260 of FIG. 2 including physical pooled memory 262 of FIG. 2, which also may be memory modules including DRAM. As an example, the logical pooled memory may be logical pooled memory included as part of logical pooled memory system 670 of FIG. 6 and the physical pooled memory may correspond to physical memory (e.g., DRAM) included as part of logical pooled memory system 670 of FIG. 6.

Step 920 may include translating any load or store instructions directed to the logical pooled memory into memory transactions for completion via a respective link between each of the plurality of compute entities and each of physical memory devices included as part of the second physical pooled memory of the first type. In one example, as explained earlier the fabric manager (e.g., fabric manager 350 of FIG. 3 or fabric manager 650 of FIG. 6) implemented using a fabric manager based on the Compute Express Link (CXL) specification may translate the load and store instructions into transactions associated with the CXL specification. The logical address space exposed to the compute entities may be at least a subset of the address range exposed by a controller associated with the CXL bus/links.

Step 930 may include indicating to a logical pooled memory controller associated with the logical pooled memory that all pages associated with the logical pooled memory initially allocated to any of the plurality of compute entities are known-pattern pages. As an example, a hypervisor (e.g., hypervisor 320 of FIG. 3 or a hypervisor associated with any of host servers 610, 620, and 630 of FIG. 6) may indicate to the logical pooled memory controller (e.g., logical pooled memory controller 450 of FIG. 4) the status of initially allocated page as known-pattern pages (e.g., known-pattern pages 414). A combination of hypervisors may also coordinate with each other to manage memory allocation to compute entities being supported by a computing system or a communication system having multiple hypervisors managing a shared logical pooled memory.

Step 940 may include the logical pooled memory controller tracking both a status of whether a page of the logical pooled memory allocated to any of the plurality of compute entities is a known-pattern page and a relationship between logical memory addresses and physical memory addresses associated with any allocated logical pooled memory to any of the plurality of compute entities. In this example, as part of this step, as explained earlier with respect to FIGS. 4-6, logical pooled memory controller (e.g., logical pooled memory controller 450 of FIG. 4) may track the status of pages (a known-pattern page or not) and the relationship between page numbers and physical addresses in the physical memory (e.g., physical pooled memory 412 of FIG. 4) using a mapping table (e.g., mapping table 482 of FIG. 4). As explained earlier, to speed up the access to the logical pooled memory at least a portion of the mapping table may be implemented as a translation lookaside buffer. In addition, the mapping table (or a similar structure) may be implemented using registers.

Step 950 may include in response to a write operation initiated by the compute entity to write any data other than a known pattern, the logical pooled memory controller allowing writing of the data to any available space in the second physical pooled memory of the first type only up to an extent of physical memory that corresponds to the portion of the logical pooled memory previously allocated to the compute entity. As explained earlier, when a compute entity (e.g., a VM) has used up all of the local physical memory allocated to it and it starts writing an unknown pattern to the logical memory address space, then the hypervisor may start allocating pages from within the logical address space (exposed by logical pooled memory controller 450) corresponding to physical memory (e.g., physical pooled memory 412 of FIG. 4 or physical pooled memory associated with logical pooled memory system 670 of FIG. 6) to the compute entity. The logical pooled memory controller may access a free pages list (e.g., physical memory free pages list 484 of FIG. 4) to access pages that are free and are not mapped by the mapping table. In addition, as explained earlier, the compute entity may not be allocated more physical memory managed by the logical pooled memory controller than previously allocated to the compute entity (e.g., 13 GB in the example described with respect to FIG. 2). This method may also allow for the oversubscription of the installed pooled memory in the system by the compute entities since more compute entities can be supported by the system without having to deploy additional physical memory (e.g., DRAM).

In conclusion, the present disclosure relates to a method comprising allocating a portion of a memory associated with a system to a compute entity, where the portion of the memory comprises a combination of a portion of a first physical memory of a first type and a portion of a logical pooled memory for use with a plurality of compute entities associated with the system. The logical pooled memory may be mapped to a second physical memory of the first type, and where an amount of the logical pooled memory indicated as being available for allocation to the plurality of compute entities may be greater than an amount of the second physical memory of the first type. The method may further include indicating to a logical pooled memory controller associated with the logical pooled memory that all pages associated with the logical pooled memory initially allocated to any of the plurality of compute entities are known-pattern pages. The method may further include the logical pooled memory controller tracking both a status of whether a page of the logical pooled memory allocated to any of the plurality of compute entities is a known-pattern page and a relationship between logical memory addresses and physical memory addresses associated with any allocated logical pooled memory to any of the plurality of compute entities. The method may further include in response to a write operation initiated by the compute entity the logical pooled memory controller allowing writing of the data to any available space in the second physical memory of the first type only up to an extent of physical memory that corresponds to the portion of the logical pooled memory previously allocated to the compute entity.

In this method, an amount of the logical pooled memory associated with the system may equal an amount of the second physical memory of the first type combined with an amount of memory corresponding to known-pattern pages backed by no physical memory of any type. The tracking both the status of whether the page of the logical pooled memory allocated to any of the plurality of compute entities is a known-pattern page and a relationship between the logical memory addresses and the physical memory addresses may comprise maintaining a mapping table. In one example, the mapping table may be implemented using a translation lookaside buffer.

The method may further include allocating the portion of the first physical memory of the first type based on a predicted use of the first physical memory of the first type by the compute entity. The method may also comprise dynamically changing an amount of the portion of the first physical memory of the first type allocated to the compute entity based on a usage pattern associated with a use of the first physical memory of the first type allocated to the compute entity.

The method may further include exposing the portion of the logical pooled memory allocated to the compute entity via a software mechanism to allow the compute entity to distinguish between the portion of the logical pooled memory allocated to the compute entity and the portion of the first physical memory of the first type allocated to the compute entity. The logical pooled memory may be coupled to a processor for executing any of the plurality of compute entities that have been allocated at least a portion of the logical pooled memory associated with the system via a respective link managed by a fabric manager.

In another example, the present disclosure relates to a system comprising a memory for use with a plurality of compute entities, where a portion of the memory comprises a combination of a portion of a first physical memory of a first type and a portion of a logical pooled memory associated with the system. The logical pooled memory may be mapped to a second physical memory of the first type and an amount of the logical pooled memory indicated as being available for allocation to the plurality of compute entities may be greater than an amount of the second physical memory of the first type. The system may further include a logical pooled memory controller, coupled to the logical pooled memory, configured to: (1) track both a status of whether a page of the logical pooled memory allocated to any of the plurality of compute entities is a known-pattern page and a relationship between logical memory addresses and physical memory addresses associated with any allocated logical pooled memory to any of the plurality of compute entities, and (2) in response to a write operation initiated by the compute entity to write any data other than a known-pattern, allow the write operation to write the data to any available space in the second physical memory of the first type only up to an extent of physical memory that corresponds to the portion of the logical pooled memory previously allocated to the compute entity.

As part of the system, an amount of the logical pooled memory associated with the system may equal an amount of the second physical memory of the first type combined with an amount of memory corresponding to known-pattern pages backed by no physical memory of any type. The logical pooled memory controller may further be configured to maintain a mapping table to track both the status of whether the page of the logical pooled memory allocated to any of the plurality of compute entities is the known-pattern page and the relationship between the logical memory addresses and the physical memory addresses associated with any allocated logical pooled memory to any of the plurality of compute entities. The mapping table may be implemented using a translation lookaside buffer.

As part of the system, in one example, a scheduler may be configured to allocate the portion of the first physical memory of the first type based on a predicted use of the first physical memory of the first type by the compute entity. The scheduler may also be configured to dynamically change an amount of the portion of the first physical memory of the first type allocated to the compute entity based on a usage pattern associated with a use of the first physical memory of the first type allocated to the compute entity. The logical pooled memory controller may further be configured to indicate to each of the plurality of compute entities that all pages associated with the logical pooled memory initially allocated to any of the plurality of compute entities are known-pattern pages.

In yet another example, the present disclosure relates to a system including a plurality of host servers configurable to execute one or more of a plurality of compute entities. The system may further include a memory, where a portion of the memory comprises a combination of a portion of a first physical memory of a first type and a portion of a logical pooled memory shared among the plurality of host servers. The logical pooled memory may be mapped to a second physical memory of the first type and an amount of the logical pooled memory indicated as being available for allocation to the plurality of compute entities may be greater than an amount of the second physical memory of the first type. The system may further include a logical pooled memory controller, coupled to the logical pooled memory associated with the system, configured to: (1) track both a status of whether a page of the logical pooled memory allocated to any of the plurality of compute entities is a known-pattern page and a relationship between logical memory addresses and physical memory addresses associated with any allocated logical pooled memory to any of the plurality of compute entities, and (2) in response to a write operation initiated by a compute entity, being executed by a processor associated with any of the plurality of host servers, to write any data other than a known pattern, allow the write operation to write the data to any available space in the second physical memory of the first type only up to an extent of physical memory that corresponds to the portion of the logical pooled memory previously allocated to the compute entity.

As part of the system, an amount of the logical pooled memory associated with the system may equal an amount of the second physical memory of the first type combined with an amount of memory corresponding to known-pattern pages backed by no physical memory of any type. The logical pooled memory controller may further be configured to maintain a mapping table to track both the status of whether the page of the logical pooled memory allocated to any of the plurality of compute entities is the known-pattern page and the relationship between the logical memory addresses and the physical memory addresses associated with any allocated logical pooled memory to any of the plurality of compute entities. The mapping table may be implemented using a translation lookaside buffer.

As part of the system, in one example, a scheduler may be configured to allocate the portion of the first physical memory of the first type based on a predicted use of the first physical memory of the first type by the compute entity. The scheduler may also be configured to dynamically change an amount of the portion of the first physical memory of the first type allocated to the compute entity based on a usage pattern associated with a use of the first physical memory of the first type allocated to the compute entity. The logical pooled memory controller may further be configured to indicate to each of the plurality of compute entities that all pages associated with the logical pooled memory initially allocated to any of the plurality of compute entities are known-pattern pages.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc, In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media, Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an" The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
 allocating a portion of a memory associated with a system to a compute entity, wherein the portion of the memory comprises a combination of a portion of a first physical memory and a portion of a logical pooled memory for use with a plurality of compute entities associated with the system, wherein the logical pooled memory is mapped to a second physical memory, and wherein an amount of the logical pooled memory indicated as being available for allocation to the plurality of compute entities is greater than an amount of the second physical memory;
 indicating to a logical pooled memory controller associated with the logical pooled memory that a set of pages associated with the logical pooled memory initially allocated to a subset of the plurality of compute entities are not backed by any of the second physical memory; and
 the logical pooled memory controller tracking both a status of whether a page of the logical pooled memory allocated to any of the plurality of compute entities is backed by the second physical memory and a relationship between logical memory addresses and physical memory addresses associated with any allocated logical pooled memory to any of the plurality of compute entities.

2. The method of claim 1, further comprising, in response to a write operation initiated by the compute entity, the logical pooled memory controller allowing writing of data to any available space in the second physical memory only up to an extent of physical memory that corresponds to the portion of the logical pooled memory previously allocated to the compute entity.

3. The method of claim 1, wherein tracking both the status of whether the page of the logical pooled memory allocated to any of the plurality of compute entities is backed by the second physical memory and the relationship between the logical memory addresses and the physical memory addresses comprises maintaining a mapping table.

4. The method of claim 3, wherein the mapping table is implemented using a translation lookaside buffer.

5. The method of claim 1, further comprising allocating the portion of the first physical memory based on a predicted use of the first physical memory by the compute entity.

6. The method of claim 1, further comprising dynamically changing an amount of the portion of the first physical memory allocated to the compute entity based on a usage pattern associated with a use of the first physical memory allocated to the compute entity.

7. The method of claim 1, further comprising exposing the portion of the logical pooled memory allocated to the compute entity via a software mechanism to allow the compute entity to distinguish between the portion of the logical pooled memory allocated to the compute entity and the portion of the first physical memory allocated to the compute entity.

8. The method of claim 1, wherein the logical pooled memory is coupled to a processor for executing any of the plurality of compute entities that have been allocated at least a portion of the logical pooled memory associated with the system via a respective link managed by a fabric manager.

9. A system comprising:
a memory, wherein a portion of the memory comprises a combination of a portion of a first physical memory of a first type and a portion of a logical pooled memory associated with the system, wherein the logical pooled memory is mapped to a second physical memory of the first type, and wherein an amount of the logical pooled memory indicated as being available for allocation to a plurality of compute entities is greater than an amount of the second physical memory of the first type; and
a logical pooled memory controller, coupled to the logical pooled memory associated with the system, configured to: (1) track both a status of whether a page of the logical pooled memory allocated to any of the plurality of compute entities is backed by the second physical memory and a relationship between logical memory addresses and physical memory addresses associated with any allocated logical pooled memory to any of the plurality of compute entities, and (2) in response to a write operation initiated by a compute entity, allow the write operation to write the data to any available space in the second physical memory of the first type only up to an extent of physical memory that corresponds to a portion of the logical pooled memory previously allocated to the compute entity.

10. The system of claim 9, wherein the logical pooled memory controller is further configured to maintain a mapping table to track both the status of whether the page of the logical pooled memory allocated to any of the plurality of compute entities is backed by the second physical memory and the relationship between the logical memory addresses and the physical memory addresses associated with any allocated logical pooled memory to any of the plurality of compute entities.

11. The system of claim 10, wherein the mapping table is implemented using a translation lookaside buffer.

12. The system of claim 9, further comprising a scheduler configured to allocate the portion of the first physical memory of the first type to the compute entity based on a predicted use of the first physical memory of the first type by the compute entity.

13. The system of claim 12, wherein the scheduler is configured to dynamically change an amount of the portion of the first physical memory of the first type allocated to the compute entity based on a usage pattern associated with a use of the first physical memory of the first type allocated to the compute entity.

14. The system of claim 9, wherein the logical pooled memory controller is further configured to expose the portion of the logical pooled memory allocated to the compute entity via a software mechanism to allow the compute entity to distinguish between the portion of the logical pooled memory allocated to the compute entity and the portion of the first physical memory of the first type allocated to the compute entity.

15. A system comprising:
a plurality of host servers configurable to execute one or more of a plurality of compute entities;
a memory, wherein a portion of the memory comprises a combination of a portion of a first physical memory of a first type and a portion of a logical pooled memory associated with the system, wherein the logical pooled memory is mapped to a second physical memory of the first type, and wherein an amount of the logical pooled memory indicated as being available for allocation to the plurality of compute entities is greater than an amount of the second physical memory of the first type; and
a logical pooled memory controller, coupled to the logical pooled memory associated with the system, configured to: (1) track both a status of whether a page of the logical pooled memory allocated to any of the plurality of compute entities is backed by the second physical memory and a relationship between logical memory addresses and physical memory addresses associated with any allocated logical pooled memory to any of the plurality of compute entities, and (2) in response to a write operation initiated by a compute entity, allow the write operation to write data to any available space in the second physical memory of the first type only up to an extent of physical memory that corresponds to a portion of the logical pooled memory previously allocated to the compute entity.

16. The system of claim 15, wherein the logical pooled memory controller is further configured to maintain a mapping table to track both the status of whether the page of the logical pooled memory allocated to any of the plurality of compute entities is backed by the second physical memory and the relationship between the logical memory addresses and the physical memory addresses associated with any allocated logical pooled memory to any of the plurality of compute entities.

17. The system of claim 16, wherein the mapping table is implemented using a translation lookaside buffer.

18. The system of claim 15, further comprising a scheduler configured to allocate the portion of the first physical memory of the first type to the compute entity based on a predicted use of the first physical memory of the first type by the compute entity.

19. The system of claim 18, wherein the scheduler is configured to dynamically change an amount of the portion of the first physical memory of the first type allocated to the compute entity based on a usage pattern associated with a use of the first physical memory of the first type allocated to the compute entity.

20. The system of claim 19, wherein the logical pooled memory controller is further configured to expose the portion of the logical pooled memory allocated to the compute entity via a software mechanism to allow the compute entity to distinguish between the portion of the logical pooled memory allocated to the compute entity and the portion of the first physical memory of the first type allocated to the compute entity.

* * * * *